United States Patent [19]

Stewart et al.

[11] Patent Number: 5,201,244
[45] Date of Patent: Apr. 13, 1993

[54] BICYCLE HANDLEBAR STEM EXTENDER

[76] Inventors: John V. Stewart, 1308 Henry Balch Dr., Orlando, Fla. 32810-4509; Cal M. Phillips, 1800 NE. 179 St., Miami, Fla. 33162

[21] Appl. No.: 846,256

[22] Filed: Feb. 27, 1992

[51] Int. Cl.$^5$ .............................................. B62K 25/08
[52] U.S. Cl. .................. 74/551.3; 74/551.1; 280/276
[58] Field of Search .............. 74/551.1, 551.2, 551.3, 74/551.4, 551.5; 188/269; 280/275, 276; 403/191, 370, 371; 267/64.26

[56] References Cited

U.S. PATENT DOCUMENTS

| | | | |
|---|---|---|---|
| 2,280,662 | 4/1942 | Pawsat | 403/370 |
| 3,936,076 | 2/1976 | Probst | 280/276 |
| 4,410,197 | 10/1983 | Hillaire | 280/279 |
| 4,553,769 | 11/1985 | Kawaguchi | 280/276 |
| 4,815,763 | 3/1989 | Hartmann | 280/276 |
| 4,881,750 | 11/1989 | Hartmann | 280/276 |
| 4,971,344 | 11/1990 | Turner | 280/276 |
| 4,988,081 | 1/1991 | Dohrmann | 267/64.26 |
| 4,995,597 | 2/1991 | Hatton | 188/269 X |
| 5,088,705 | 2/1992 | Tsai | 267/226 X |
| 5,098,120 | 3/1992 | Hayashi et al. | 280/276 X |

*Primary Examiner*—Rodney H. Bonck
*Assistant Examiner*—Ryan W. Massey

[57] ABSTRACT

A simple, user-installable device for raising the handlebars of bicycles to allow an upright sitting posture, comprising a section of tubing, with one end (2) adapted to receive the handlebar stem (8), and the other end (1) adapted for insertion into the steering shaft (7). It is fixed in the steering shaft via an expansion device (5), and the handlebar stem is fixed in the extender via its own expansion device. An optional shock absorber may be included in the extender. In this embodiment, the upper end of the extender is enlarged to contain a slidable hollow plunger (21) which receives the handlebar stem. The plunger is damped to isolate frame vibration from the user's arms. This also reduces shock on the front wheel by isolating the mass of the handlebars from the fork. In addition to raising the handlebars, the stem extender can be designed to accept a replacement stem of different diameter than the original.

7 Claims, 2 Drawing Sheets

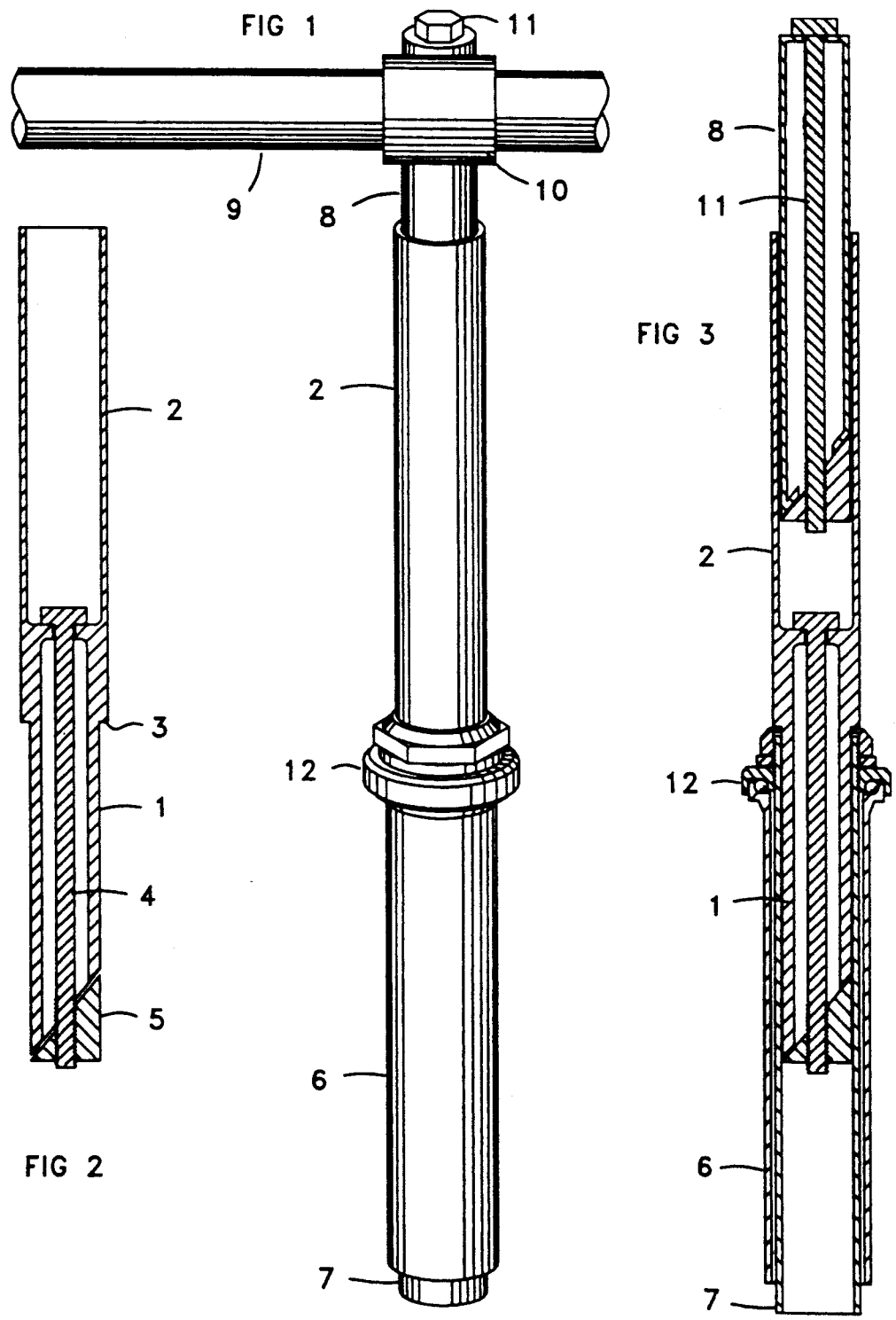

U.S. Patent    Apr. 13, 1993    Sheet 2 of 2    5,201,244
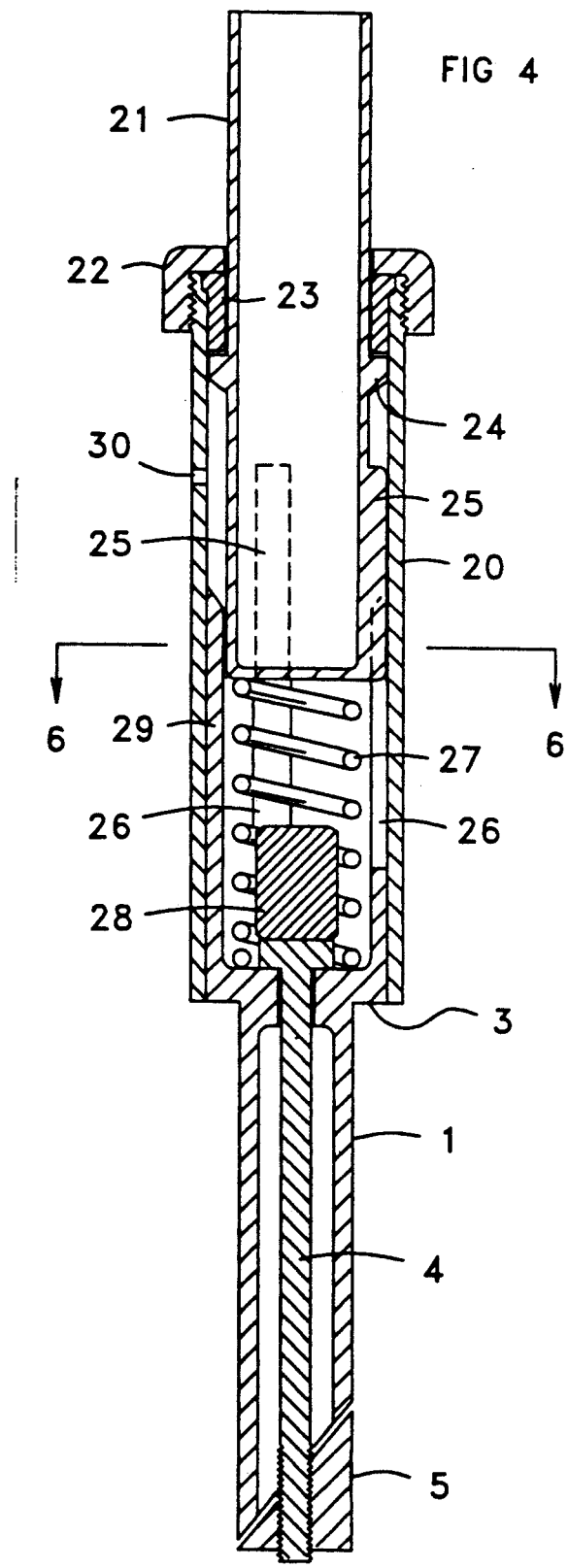
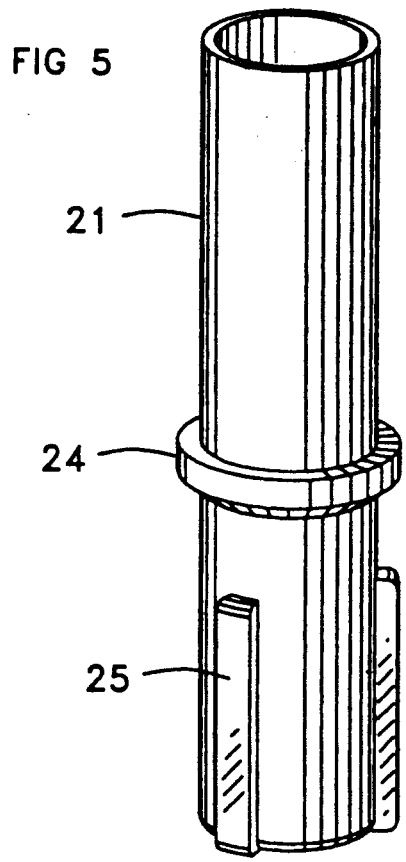
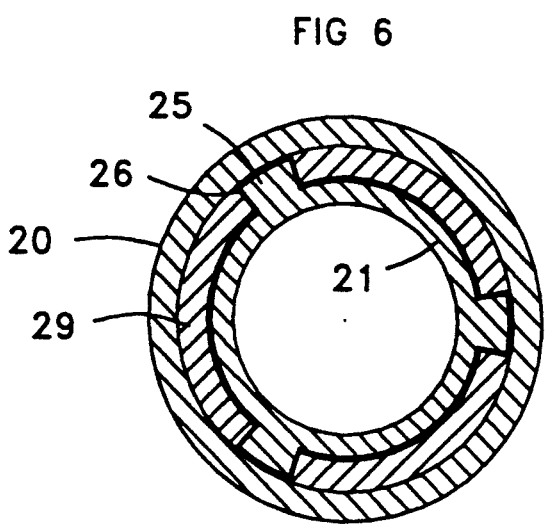

BICYCLE HANDLEBAR STEM EXTENDER

BACKGROUND

1. Field:

This invention relates to bicycles and their components and accessories, particularly to bicycle handlebars and shock absorbers.

2. Prior Art:

Many bicycles do not allow an upright sitting posture, due to the low height of the handlebars. For cyclists who prefer to sit upright, some bikes are provided with very tall handlebars, extending upward from the stem in a "V" shape. Such handlebars are heavier than necessary, since each handle is extended, using twice as much tubing as an extended stem. Furthermore, the handlebars cannot be lowered when the preference or owner changes.

Prior U.S. Pat. No. 4,410,197 addresses this with a handlebar stem extender. However, it is unnecessarily complex, having two separate parts which must be assembled in proper relation by the user. The upper nut on the steering shaft must be removed to attach the extender shaft. This procedure can alter the steering bearing preload, which must be checked and readjusted.

Various shock absorption means have been applied to bicycles. An example is U.S. Pat. No. 4,881,750. However, they are generally complex, heavy, and not user installable. Independent shocks on each side of a wheel cause loss of fork rigidity, increased stress on the hub-to-fork connections, and possible dragging of the wheel rim on the caliper brake pads.

OBJECTIVES

The objectives of the invention include:
a) user installable means to raise the handlebars of bicycles to allow an upright sitting posture of the rider;
b) means to replace a handlebar stem with one having a different diameter;
d) user-installable shock absorber means to isolate bicycle frame vibration from the rider's arms;
e) the shock absorber should not reduce fork rigidity;
f) the basic device, and its options, should be simple and light weight.

SUMMARY OF THE INVENTION

The invention is a simple, user-installable device for raising the handlebars. It comprises a section of tubing, with one end adapted to receive the handlebar stem, and the other end adapted for insertion into the steering shaft. It is fixed in the steering shaft via an expansion device, and the handlebar stem is fixed in the extender via its own expansion device.

An optional shock absorber may be included in the extender. In this embodiment, the upper end of the extender is enlarged to contain a slidable hollow plunger which receives the handlebar stem. The plunger is damped to isolate frame vibration from the user's arms. This also reduces shock on the front wheel by isolating the mass of the handlebars from the fork. It adds little weight and no loss of fork rigidity.

DRAWINGS

FIG. 1 shows a frontal view of stem extender installed in head of bicycle frame.

FIG. 2 shows a sectional view of basic extender.

FIG. 3 shows a sectional view of extender installed as in FIG. 1.

FIG. 4 shows a sectional view of extender with integral shock absorber.

FIG. 5 shows a frontal view of plunger (21) of the shock absorber.

FIG. 6 shows a cross section of shock absorber, taken along line 6—6 in FIG. 4.

REFERENCE NUMERALS

1 Lower end of extender, which fits into steering shaft
2 Upper end of extender, which accepts handlebar stem
3 Annular shelf
4 Bolt for fixing the extender in steering shaft
5 Wedge nut for fixing the extender in steering shaft
6 Head of bicycle frame
7 Steering shaft
8 Handlebar stem
Handlebar
10 Handlebar mounting bracket (attached to stem 8)
11 Bolt for fixing the handlebar stem in extender
12 Upper bearing of steering shaft
20 Outer tube of shock absorber
21 Plunger of shock absorber
22 Cap nut
23 Flexible bushing
24 Annular stop on plunger
25 Plunger key
26 Keyway
27 Spring
28 Flexible bumper
29 Inner tube of shock absorber
30 Air bleed hole

DESCRIPTION

The basic extender of FIG. 2 comprises a rigid tube, with a reduced end 1 having the same outer diameter as the original handlebar stem, so it can be inserted into steering shaft 7 and fixed therein with a bolt-operated expansion means, such as the wedge nut 5 shown. Upper end 2 has the same inner diameter as the steering shaft, so the handlebar stem can be inserted into it. Annular shelf 3 stops insertion of the extender into the steering shaft at a predetermined depth.

A stem extender can be designed to accept a replacement stem with a different diameter than the original stem. In such a design, upper end 2 has an inner diameter different than the steering shaft, being sized instead to accept the replacement stem.

The shock absorber embodiment of FIG. 4 has a plunger 21, which slides in a limited range within the upper end of the extender. The plunger has longitudinal keys on its sides, guided by keyways inside the extender tube. The keys transfer steering torque from the plunger to the extender. The keyways can be machined as slots on an inner tube 29, which is then integrated with an outer tube 20 during manufacturing. The plunger is air damped by close tolerance of stop 24 within tube 20, and by the sealing effect of flexible bushing 23, which also acts as an upper bumper. A small air bleed can be made through the wall of tube(s) 20, 29, to reduce air damping. A spring 27 urges the plunger upward. The spring may partly compress under rider's arm weight, or it may hold the plunger at the top until a shock is encountered. An optional flexible bumper 28 prevents hard bottoming of the plunger under any condition. It must be taller than the fully compressed spring. Spring 27 and bumper 28 may be attached to the bottom of the plunger so that all internal components stay together when removed.

This is just an example of shock absorber designs which could be employed. The special requirements are: 1) the plunger must transfer torque to the extender tube; 2) the plunger must be hollow, with an inner diameter the same as the steering shaft, or sized to accept a replacement stem; 3) means for fixing the extender tube in the steering shaft, such as bolt 5, must be accessible for installation.

A replacement stem could be included as part of the shock absorber embodiment, in which case, the plunger is the lower end of the replacement stem.

Specifics in the description and drawings are used to illustrate some of the presently preferred embodiments of the invention, and should not be construed as limiting the scope of the invention, which should be determined by the claims and their legal equivalents. The invention is applicable to pedalpowered wheeled vehicles in general (velocipeds), including bicycles and tricycles, and motorized versions of these vehicles.

PREFERRED EMBODIMENT

For most users, the basic embodiment of FIG. 2 is suggested. A shock absorber embodiment such as FIG. 4, can be offered as an option.

OPERATION

INSTALLATION: The handlebar stem is removed from the steering shaft by loosening bolt 11. End 1 of the extender is inserted into the steering shaft, and fixed by tightening bolt 4 with a socket wrench inserted through end 2. The handlebar stem is then inserted into end 2, and fixed therein with bolt 11.

If a shock absorber such as FIG. 4 is included, cap nut 22 and internal components 23, 21, 27, and 28 are removed temporarily for access to bolt 2 for locking end 1 in the steering shaft. The components are then reassembled, and the stem is fixed into plunger 21.

USE: The rider operates the modified bicycle in a more upright seating posture.

I claim:

1. A stem extender for raising the handles of a velociped having a frame head, a hollow steering shaft, and a handlebar stem, the steering shaft rotatably mounted in the frame head, the stem extender comprising:
   a tube, having a first end and a second end;
   the first end fitting closely within the inner diameter of the steering shaft;
   fixing means for locking the first end inside the steering shaft;
   the second end of the tube having means for engaging the stem in axial alignment with the tube and rotationally fixed relative thereto.

2. The stem extender of claim 1, wherein the inner diameter of the second end of the tube fits closely around the stem.

3. The stem extender of claim 1, wherein the first end of the tube has the same outer diameter as the stem, and the second end of the tube has the same inner diameter as the steering shaft.

4. The stem extender of claim 1, wherein the stem-engaging means comprises:
   a hollow plunger, axially slidable in the second end of the tube;
   the plunger having an inner diameter which fits closely around the stem;
   key means for fixing the plunger rotationally relative to the tube; and means for damping the sliding motion of the plunger.

5. The stem extender of claim 4 wherein the damping means comprises:
   means in the second end of the tube for urging the plunger in a direction away from the first end of the tube;
   an air seal between the outer diameter of the plunger and the inner diameter of the second end;
   and further comprising:
   stop means in the second end for retaining the plunger in the second end against the urging means.

6. A stem extender for raising the handles of a velociped having a handlebar stem and a hollow steering shaft, the stem extender comprising:
   a tube, having a first end and a second end;
   the first end having the same outer diameter as the stem;
   the second end having the same inner diameter as the steering shaft; and
   fixing means for locking the first end of the tube inside the steering shaft.

7. The stem extender of claim 6, wherein the first end of the tube terminates in a surface that is inclined to the tube axis, and the fixing means comprises:
   a bolt, passing axially through the first end of the tube, having a threaded portion extending outward through the inclined surface of the tube;
   a wedge nut having a surface adjacent to and matching the inclined surface of the tube;
   the nut having the same diameter as the first end of the tube, and having internal threads which engage the threaded portion of the bolt.

* * * * *